May 30, 1967 J. K. BIRKENHEUER 3,321,876
COLLAPSIBLE SLEEPING COMPARTMENT FOR AUTOMOBILES
Filed March 19, 1965 2 Sheets-Sheet 1
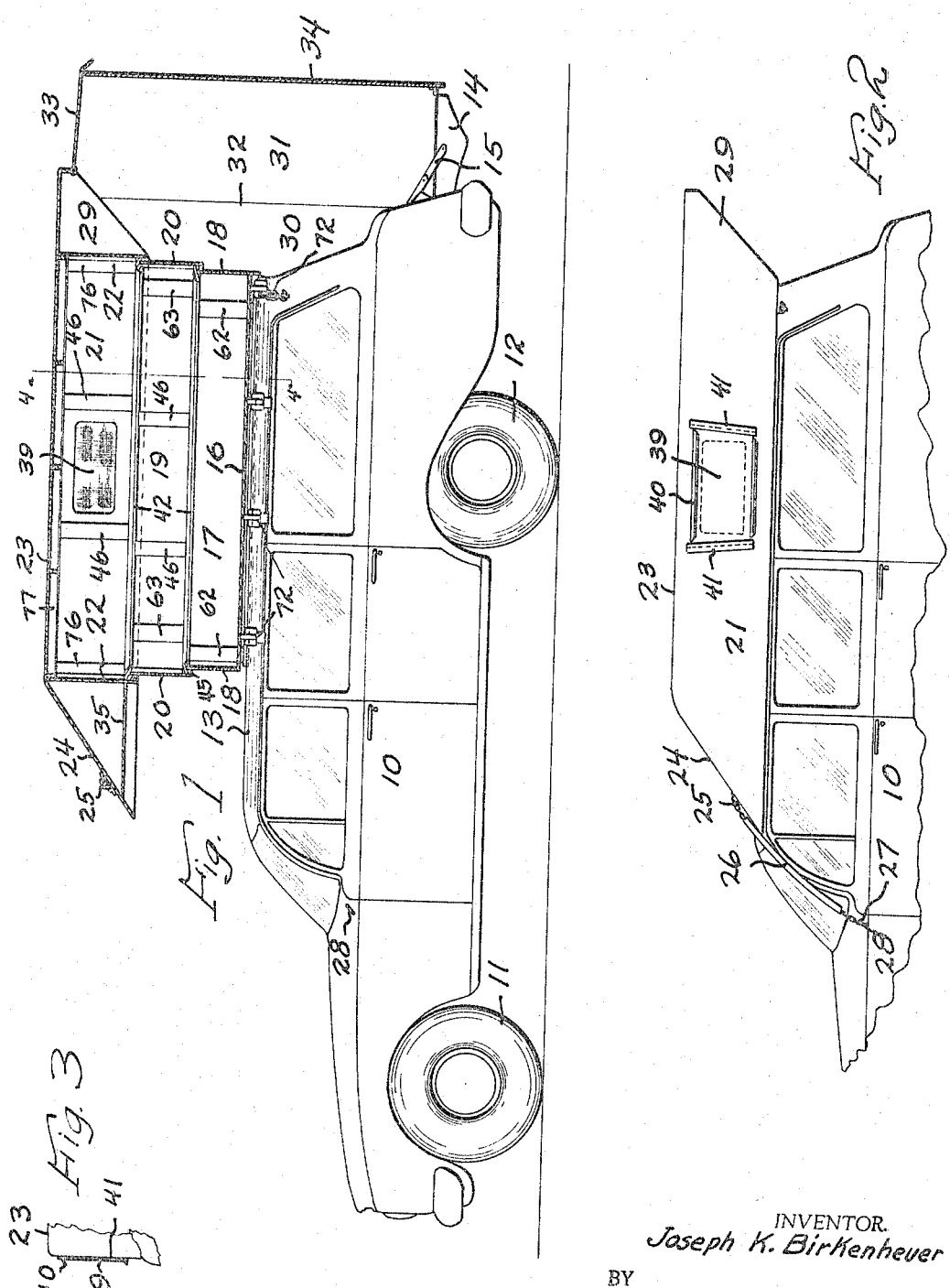
INVENTOR.
Joseph K. Birkenheuer
BY
ATTORNEY

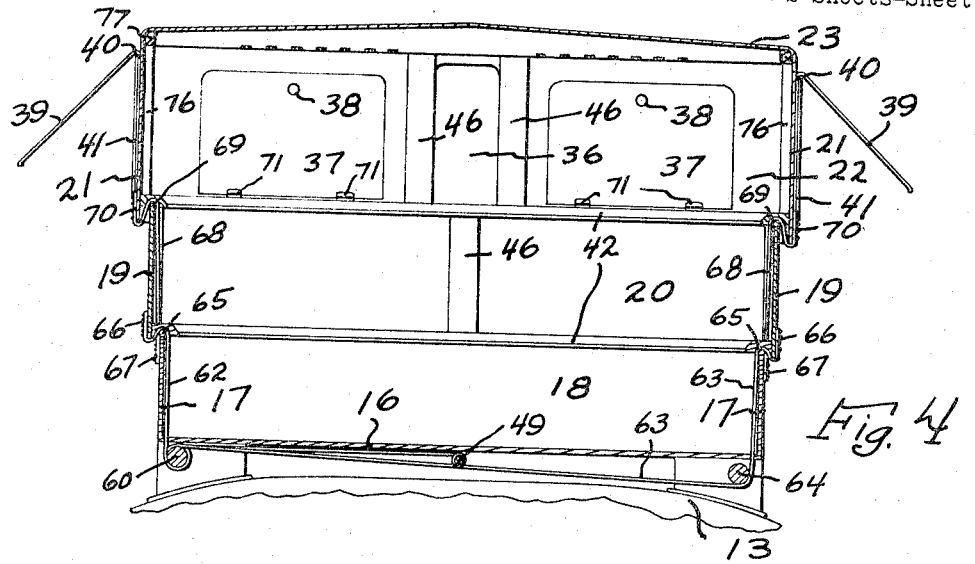
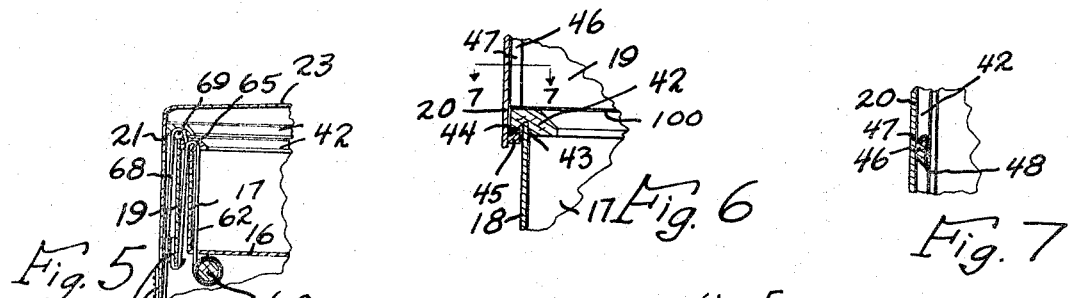
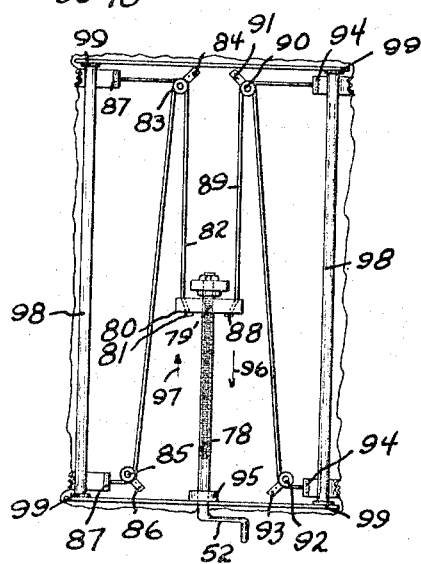
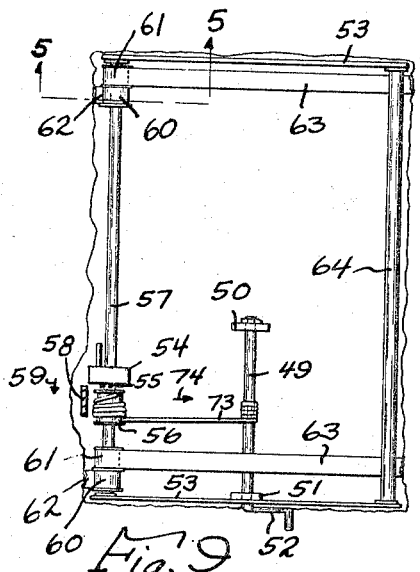

United States Patent Office 3,321,876
Patented May 30, 1967

3,321,876
COLLAPSIBLE SLEEPING COMPARTMENT
FOR AUTOMOBILES
Joseph K. Birkenheuer, 1720 Warren Place,
Sioux Falls, S. Dak. 57105
Filed Mar. 19, 1965, Ser. No. 441,077
1 Claim. (Cl. 52—66)

My invention relates to a collapsible sleeping compartment for automobiles.

An object of my invention is to provide in association with the top of a vehicle, a collapsible and raisable sleeping compartment unit which can be extended to a relatively high elevation so as to provide sleeping quarters, and which can also be collapsed to occupy a minimum amount of space.

A further object of my invention is to provide a raisable unit which includes an efficiently operating raising mechanism having desirable characteristics.

A further object of my invention is to provide an arrangement which when collapsed will have streamlined features.

A further object of my invention is to provide certain other advantages which will be apparent.

With these and other objects in view, my invention consists in the construction, arrangement, and combination of the various parts of my device, whereby the objects contemplated are attanied, as hereinafter more fully set forth, pointed out in my claim, and illustrated in the accompanying drawings, in which:

FIGURE 1 is a side elevation of a vehicle with my unit attached thereto and with the unit itself being taken in cross section, FIGURE 2 is a side elevation of the unit in its collapsible position, FIGURE 3 is a detail, FIGURE 4 is an enlarged sectional view taken substantially along the lines 4—4 of FIGURE 1, FIGURE 5 is an enlarged sectional view taken along the lines 5—5 of FIGURE 9.

FIGURE 6 is an enlarged detail,

FIGURE 7 is a sectional view taken along the lines 7—7 of FIGURE 6,

FIGURE 8 is a plan view of a modified arrangement, and

FIGURE 9 is a plan view of a portion of the raising mechanism.

My invention contemplates the provision of a collapsible housing unit which can be carried on the top of an automobile, and will pertain generally to a vehicle of the station wagon type, it being understood however that it can be usable with any other type as well. In describing my invention I have used the character 10 to designate generally the station wagon having the front wheels 11, rear wheels 12 and top wall 13, the character 14 indicating a rear end portion which folds outwardly as shown and which is supported by the braces 15.

In describing my invention itself I have used the character 16 to indicate the bottom wall of a lower-most unit, this unit including the side walls 17 and end walls 18, the character 19 indicates further side walls of a further intermediate portion which merge with the further forward walls 20, the character 21 indicating the side walls of an upper-most portion having the end walls 22, the character 23 indicating the roof portion of this upper-most section.

The wall 23 extends into a sloping wall portion 24 to which is attached at 25 a pair of straps or chain elements 26 having the hook portions 27 attached thereto adapted to engage the hooks 28 when the unit is in its collapsed position as shown in FIGURE 2, the hooks 28 being attached to the vehicle hood as shown.

The character 29 indicates further side wall portions and the characters 30 and 31 indicate side panels suitably hinged at 32, the character 33 indicating an upper panel portion, and the character 34 indicates a rear panel portion.

The character 35 indicates a further wall, and the wall 22 includes a ventilating opening at 36 (see FIGURE 4) and also includes the panels 37 having the openings 38 in which openings the fingers can be placed to open the panels 37 when desired.

The character 39 indicates screen or window elements having the angularly bent portions 40, the sides of the members 39 being received in the downwardly diverging channels 41 (see FIGURE 2), this arrangement providing means for either holding the window or screen 39 in a flat position, or by inserting the bent portions 40 in the upper portions of the members 41 the members 39 will be positioned at angles as shown in FIGURE 4 when it is desired to secure a protecting feature as well as additional ventilation etc., and usually when the unit is stationary.

Each of the lower sections include the perimetral strips 42 to which the upper edges of the various walls are attached as at 43 (see FIGURE 6), these strips 42 also including the inclined portions 44 adapted to register with the sloping abutment members 45 attached to the bottoms of certain of the further walls 19, 20, 21 and 22. The character 46 indicates vertical strips (see FIGURE 7) attached to the walls as shown, the strips 46 having the sloping portions 47, these strips 46 being adapted to be engaged within the openings 48 in the members or strips 42, and being of the same configuration so that the strips will pass through these openings when the unit is being raised or collapsed.

The device for raising and lowering the units comprises a shaft 49 (see FIGURE 9) journaled in the bracket 50 which bracket can be attached to the top of the vehicle or to any other type of base, the shaft 49 being further journaled within the post 51, the character 52 indicating a detachable handle for rotating the shaft 49, the character 53 indicating end support members.

The character 54 indicates a square braking device having the prongs 55 adapted to engage openings in the reel 56 which is attached to the shaft 57 so that when the member 54 is moved in the direction of the arrow 59 the plate 58, which is attached to the wall 16 will prevent rotation of the shaft 57, since the flat side of the member 54 will engage the plate, the prongs 55 entering suitable openings in the reel 56, this arrangement providing for securing the expanded sections at any point. Attached to the shaft 57 are the reel members 60 and 61, and reeled upon the reels 60 are the belts 62, and reeled upon the reels 61 are the belts 63. The belts 63 pass beneath the further shaft or roller element 64. The belts 62 pass over the small rollers 65 (see FIGURE 5) which are attached to the upper edges of the walls 17 and thence pass downwardly where they are attached at 66 to the lower edges of the walls 19. Attached at 67 to the walls 17 (see FIGURE 4) are the further straps 68 which pass over further rollers 69, which rollers 69 are attached to the upper edges of the walls 19, the belts 68 thence being attached at 70 to the lower edges of the upper walls 21.

In describing further elements of my invention I have used the character 71 to indicate hinges for hinging the panels 37 to the upper strips 42, and I have further used the character 72 (see FIGURE 1) for indicating suitable members for attaching the unit to the top of the vehicle. The rear walls 22, 20 and 18 include open spaces to provide means for entering the unit from the rear. A cable 73 is wound upon the reel 56 and is also wound upon the shaft 49, and when it is desired to raise the unit to the position shown in FIGURE 4, the handle 52 is rotated so that the cable 73 will be pulled in the direction of the arrow 74, the member 54 first being engaged with the reel 56.

This action will cause the reels 60 (see FIGURE 5) to rotate in the direction of the arrow 75 which will correspondingly draw the straps 62 downwardly, and due to this action the intermediate walls 19 will be drawn upwardly, carrying the intermediate section upwardly also. At the same time the straps 68, since they are affixed at 67 and since the intermediate section is rising, will correspondingly roll over the rollers 69 which will raise the top-most section, until the unit is fully expanded to its maximum vertical height. The same action is provided at the other side of the arrangement wherein the straps 63 will perform the same action, so that as a result the unit can be raised by a simple operation. For additionally maintaining the unit in its expanded position, I provide the lengthened blocks 76 which are merely inserted between the members 42 and the members 77, the position of the blocks at these points thereby preventing the units from collapsing downwardly. The straps 68 pass through suitable slots in the lower member 42. When collapsing the unit, the brake is released, and the handle is rotated in the opposite direction.

A further modification of the raising and lowering mechanism is shown in FIGURE 8 with identical characters indicating identical parts, and in this modification I have used the character 78 to indicate a lengthened screw threadably engaged at 79 with a block 80, to which are attached at 81 the cables 82 passing over a pair of pulleys 83 secured at 84, one of the cables 82 passing over a further pulley 85 secured at 86, the cables 82 being secured as at 87 to the belts 62.

Attached to the block 80 at 88 are the further cables 89 passing over similar pulleys 90 attached at 91, one of the cables 89 passing over the further pulley 92 secured at 93, the cables 89 being attached at 94 to the belts 63. The screws 78 is journaled at 95 and can be rotated by a similar handle 52, and it will be noted that by virtue of this arrangement the rotation of the screw 78 will cause the block 80 to travel in the direction of the arrow 96 for raising the collapsible units, or in the direction of the arrow 97 when lowering the units. In this latter construction the shaft members 98 can be attached or journaled at 99. This mechanism also provides a construction which will be secured at any position without a braking device, by virtue of the threaded engagement at 79. Thin jar-proof strips 100 are attached to the members 42 (see FIGURE 6).

After the units are raised to the position shown in FIGURES 1 and 4, the various panels 30, 31, 33 and 34 can be placed in position, and the persons occupying the unit can climb upwardly by any suitable means and enter the openings provided in the rear walls 18, 20 and 22.

It will be particularly noted that the raisable and collapsible units can be provided in a very compact structure which when raised will occupy a substantial height, and it will be understood that various slight modifications could be made without departing from the basic principles mentioned herein. It will be noted that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A collapsible sleeping compartment for automobiles comprising an enclosed unit adapted to be secured to the top of said automobile, said unit including a plurality of downwardly collapsible sections, and a bottom section, all of said sections being progressively enclosed within each other, said sections including perimetral strips adapted to abut against each other when said sections are raised, certain of said sections including vertically positioned guide members attached thereto slidably received in certain of said strips, said sections including a top section and an intermediate section, means for raising said intermediate section and said top section including straps passing upwardly and over said lower section and thence downwardly and being attached to the bottom of said intermediate section, further straps being attached to the top of said bottom section, and passing over the top of said intermediate section, and being attached to the bottom of said top section, means for drawing said first mentioned straps downwardly, including a rotatable screw member, a single block threadably engaged with said screw member, cables attached between said block and said first mentioned straps.

References Cited

UNITED STATES PATENTS

| 301,019 | 6/1884 | Teal | 52—118 |
| 550,418 | 11/1895 | Miller | 296—23.3 |
| 2,055,930 | 9/1936 | Josephs | 296—23.3 |
| 2,538,736 | 1/1951 | Spencer | 52—67 X |
| 2,576,389 | 11/1951 | Craighead | 52—122 X |
| 2,601,684 | 6/1952 | Martin | 296—23 X |
| 2,739,833 | 3/1956 | Schenkel | 52—67 |
| 2,944,852 | 7/1960 | Snyder | 52—67 |

FOREIGN PATENTS

| 1,015,333 | 1952 | France. |

FRANK L. ABBOTT, *Primary Examiner.*

JOHN E. MURTAGH, *Examiner.*